Oct. 8, 1957  D. ALPERT  2,808,980
ELECTRICAL VACUUM PUMP
Filed Sept. 23, 1953

WITNESSES:
E. A. McCloskey
Leon M. Harman

INVENTOR
Daniel Alpert.
BY
F. E. Browder
ATTORNEY

2,808,980

ELECTRICAL VACUUM PUMP

Daniel Alpert, Pittsburgh, Pa., assignor to Westinghouse Electric Corporation, East Pittsburgh, Pa., a corporation of Pennsylvania Application September 23, 1953, Serial No. 381,931

8 Claims. (Cl. 230—69)

My invention relates to vacuum pumps and in particular comprises a pump utilizing the combined action of electrical, thermal and mechanical agencies to attain extremely low molecular pressures.

In pumping gases of pressures in the order of magnitude of the atmosphere, it is pressure gradient which, in final analysis, means collision of molecule with molecule, which is the agency for removing molecules from the intake to the offtake duct. But under conditions referred to today by the term "high vacuum," where the mean free path of molecules is much larger than the duct diameter, a real pressure gradient can hardly be said to exist and the actual mechanism of exhausting may be considered more nearly to consist in capturing, by some agency, the molecules which have velocities directed outward along the axis of the duct at its offtake end. This process is really quite different from the above-described conventional "pumping" at higher pressures. In the so-called "diffusion pumps," which are widely used today, a stream of oil or mercury molecules intersecting the offtake duct, and having velocities directed, on the average, outwardly along its axis, are the agents by which this capture is effected; but there are large random components of other velocities also present in such streams which greatly detract from their efficiency in carrying out the removal function.

It can be shown that when gas molecules at around room temperature collide with a solid wall, a very large percentage of them stick to the wall, at least for a short time, so that the latter is covered by a thin layer of adsorbed molecules of the gas, which evaporate one by one at a rate fixed by temperature of the surface.

It is also possible to drive ions into the surface which may be trapped within the solid wall for long periods of time or until the solid material is raised to high temperatures. This mechanism is more important in some cases than the "adsorption" process.

In my present invention, I make use of the foregoing principles by arranging a surface, which continuously moves past the offtake duct from an enclosure which is undergoing exhaust, which outgoing gas molecules strike and are carried away to a second duct which is maintained at only slightly higher pressure due to another pump. At the second duct the moving surface is heated, enhancing the rate of evaporation of the captured molecules, and delivering them to the higher-pressure intake of the second pump which permanently removes them from the evacuated system. The moving surface is then cooled to its original temperature and returned to the offtake from the evacuated enclosure, and this cycle of removal carried on indefinitely. Moreover, the gas molecules are attracted to the offtake duct from the enclosure, and given predominant components of velocity outward along its axis, by electrodes in that duct which ionize the gas molecules and accelerate them along the duct axis. So high an efficiency in pumping action is thus attained that it is even possible to dispense with the liquid air or other cold-traps usually employed in present high-vacuum pumping systems.

The principal object of my invention is accordingly to provide a new and improved high-vacuum pump.

Other objects of my invention will become apparent upon reading the following description taken in connection with the drawings in which.

Figure 1:
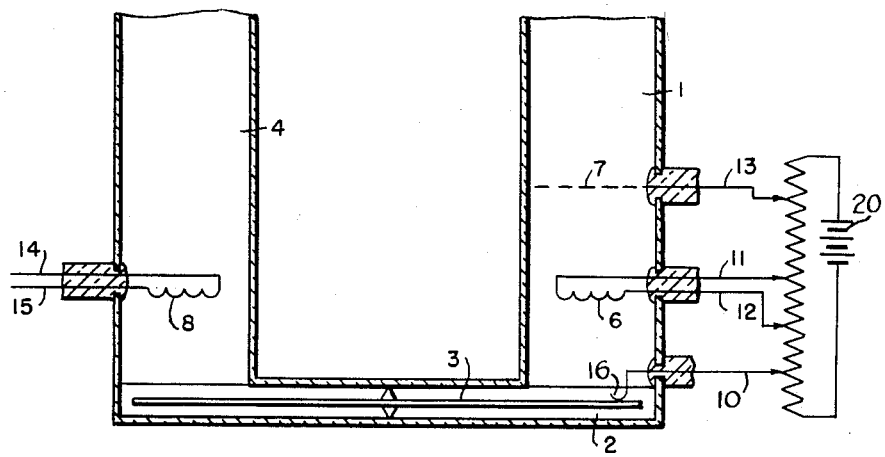
Figure 1 is a diagrammatic view useful in explaining my invention.
Figure 2:
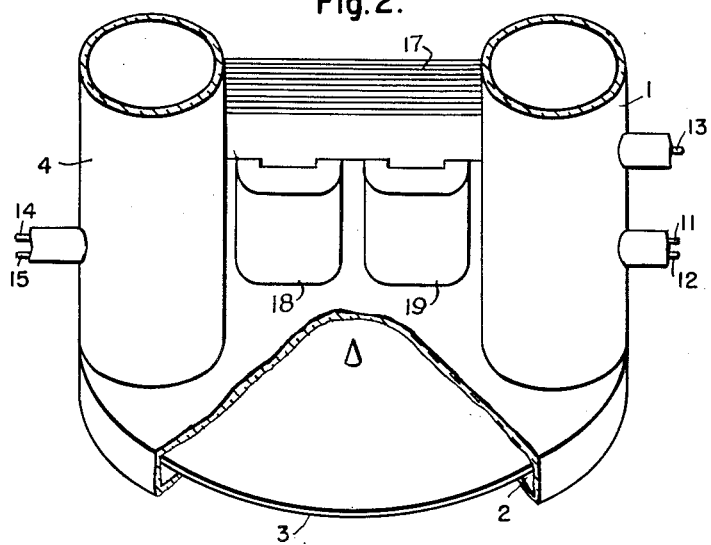
Fig. 2 is a perspective view, partly broken away of a pump of the type to which Fig. 1 refers.

Referring in detail to Figs. 1 and 2, an offtake duct 1 which may be called the input duct 1 of the vacuum pump leading from any enclosure to be exhausted, and which should, of course, be as short, direct and as large in cross-section as is feasible, has its outlet in the wall of a cylindrical chamber 2 of small axial dimension compared with its radius. The chamber 2 may have walls of steel or of glass or other ceramic. On central bearings within chamber 2 is supported a circular disc 3 of thin metal such as nickel, tungsten or molybdenum around five mils in thickness. The disc 3 is provided with any suitable means for rotating it at about 60 R. P. M. For example, an induction device as shown in Fig. 2 may be used to rotate the disc 3. A laminated magnetic structure 17 and a pair of magnetic coils 18, 19 are shown which operate in the manner well-known in the art. The upper and lower walls of chamber 2 should be spaced away from disc 3 by as small a distance as possible.

Diametrically opposite the input duct 1 is the opening to an output duct 4 leading to a backing-up pump capable of maintaining a relatively high vacuum therein. The output duct 4 is provided with means 8 for heating the surface of the disc 3. The input duct 1 is provided with an electron emissive cathode 6 positioned near its outlet and a grid-like electrode 7 more remote from its outlet and maintained at a positive potential relative to the cathode 6. The cathode 6 is provided with in-leads 11, 12; the anode 7 with a lead 13; and the heater 8 with in-leads 14, 15 suitably sealed in insulation through the walls of ducts 1 and 4. If desired, means may be provided to impress a voltage gradient making anode 7 positive relative to cathode 6, and if desired means to make disc 3 negative in potential relative to cathode 6. For example, a whisker contact 16 may be connected by an in-lead 10 to a suitable source of potential 20 in a manner well known in the art.

The mode of operation of the above-described pump will doubtless be clear from what has already been said. Gas molecules moving through the openings in grid 7 from the enclosure being exhausted will soon be struck by electrons moving from cathode 6 to anode 7 and will be ionized by such collision. The ions will then be accelerated toward cathode 6 and will, in most cases, pass by the latter and strike a spot on the surface of disc 3 where they will stick and be carried over to the region opposite the orifice of output duct 4. The rise in temperature produced by heater 8 in the surface layer of molecules adhering to disc 3 will cause some of them to evaporate into output duct 4 and be carried away to the pump attached thereto. The heated portion of disc 3 will then cool again, as it moves toward input duct 1 and this continual heating of the surface layer of molecules as they move from input duct 1 to output duct 4, and cooling the surface layer as it moves from output duct 4 to input duct 1 continues as long as the pump is operated.

While I have described the backing-up pump as maintaining the chamber 2 at a high vacuum, my arrangement will be operative even though this pressure is of the magnitude of millimeters of mercury. In this case also, the electric field between disc 3 and anode 7 would drive ions into disc 3 with considerable force but they would be driven out again by the heating effect of heater 8 as already described.

I claim as my invention:

1. A vacuum pump comprising vacuum tight walls having an intake duct, a perforated cathode in said duct near said walls and a perforated anode in said duct further from said walls, a disc supported within said walls and means to cause its rotation about an axis parallel to but displaced from the axis of said intake duct, an output duct parallel to said axes and having its intake end closely adjacent the radial surface of said disc and means to heat said radial surface adjacent said intake end.

2. A vacuum pump comprising vacuum tight walls having an intake duct, a perforated cathode in said duct near said walls and a perforated anode in said duct further from said walls, a disc supported within said walls with its radial surface closely adjacent the output end of said intake duct and means to cause its rotation about an axis parallel to but displaced from the axis of said intake duct, an output duct parallel to said axes and having its intake end closely adjacent the radial surface of said disc and means to heat said radial surface adjacent said intake end.

3. A vacuum pump comprising vacuum tight walls having an intake duct, a perforated cathode in said duct near said walls and means to produce an electric field parallel to the axis of said duct, a disc supported within said walls and means to cause its rotation about an axis parallel to but displaced from the axis of said intake duct, an output duct parallel to said axes and having its intake end closely adjacent the radial surface of said disc and means to heat said radial surface adjacent said intake end.

4. A vacuum pump comprising vacuum tight walls having an intake duct, a perforated cathode in said duct near said walls and means to produce an electric field parallel to the axis of said duct, a disc supported within said walls with its radial surface closely adjacent the output end of said intake duct and means to cause its rotation about an axis parallel to but displaced from the axis of said intake duct, an output duct parallel to said axes and having its intake end closely adjacent the radial surface of said disc and means to heat said radial surface adjacent said intake end.

5. A vacuum pump comprising vacuum tight walls having an intake duct, a cathode partly filling the cross-section of said duct and positioned near said walls, an anode partly filling the cross-section of said duct and positioned further than said cathode from said walls, an output duct in another portion of said walls, a movable surface in said pump which moves close to said duct walls from one duct to the other, and means to heat said movable surface adjacent the opening through said walls of said output duct, and means for making the electrical potential of said movable surface negative relative to said cathode.

6. A vacuum pump comprising vacuum tight walls having an intake duct, a cathode partly filling the cross-section of said duct and positioned near said walls an anode partly filling the cross-section of said duct and positioned further than said cathode from said walls, an output duct in another portion of said walls, a movable surface in said pump which moves close to said duct walls from one duct to the other, and means to heat said movable surface adjacent the opening through said walls of said output duct, and means for maintaining a potential gradient between said cathode and said movable surface.

7. A vacuum pump comprising vacuum tight walls enclosing a chamber, said walls having an input duct and an output duct, a movable surface within and closely spaced from said walls which surface moves from one duct to the other, an ionizing means comprising a cathode and an anode each filling only a portion of the cross section of said input duct, said cathode being positioned between said anode and said chamber, said ionizing means being operable to send a beam of electrons from said cathode to said anode to ionize at least a portion of the gas being pumped by said pump so that the gaseous ions impinge upon and are sorbed by said movable surface, and means to heat the portion of said movable surface which is adjacent said output duct to expel the gas previously sorbed by said movable surface.

8. A vacuum pump comprising vacuum tight walls enclosing a chamber, said walls having an input duct and an output duct, a movable surface within and closely spaced from said walls which surface moves from one duct to the other, an ionizing means filling only a portion of the cross section of said input duct, said ionizing means being operable to ionize at least a portion of the gas being pumped by said pump so that the gaseous ions impinge upon and are sorbed by said movable surface, and means to heat the portion of said movable surface which is adjacent said output duct to expel the gas previously sorbed by said movable surface.

References Cited in the file of this patent

UNITED STATES PATENTS

| | | |
|---|---|---|
| 1,587,321 | Hunter | June 1, 1926 |
| 2,160,863 | Hickman | June 6, 1939 |
| 2,282,401 | Hansell | May 12, 1942 |

FOREIGN PATENTS

| | | |
|---|---|---|
| 684,710 | Great Britain | Dec. 24, 1952 |